United States Patent
Meunier et al.

(10) Patent No.: US 9,436,649 B2
(45) Date of Patent: Sep. 6, 2016

(54) SYSTEM AND METHOD FOR UPDATING AN ELECTRONIC CALENDAR

(71) Applicant: Xerox Corporation, Norwalk, CT (US)

(72) Inventors: Jean-Luc Meunier, St-Nazaire les Eymes (FR); Caroline Hagege, Grenoble (FR); Stefania Castellani, Meylan (FR); Denys Proux, Eybens (FR); Eric Cheminot, Meylan (FR); Frederique Segond, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 437 days.

(21) Appl. No.: 13/677,584

(22) Filed: Nov. 15, 2012

(65) Prior Publication Data

US 2013/0073662 A1    Mar. 21, 2013

Related U.S. Application Data

(62) Division of application No. 12/794,212, filed on Jun. 4, 2010, now Pat. No. 8,346,879.

(51) Int. Cl.
*G06F 15/16* (2006.01)
*G06Q 10/10* (2012.01)

(52) U.S. Cl.
CPC ............ *G06F 15/16* (2013.01); *G06Q 10/107* (2013.01)

(58) Field of Classification Search
USPC ........................................................ 709/206
See application file for complete search history.

(56) References Cited

U.S. PATENT DOCUMENTS

| | | | |
|---|---|---|---|
| 7,058,567 B2 | 6/2006 | Aït-Mokhtar et al. | |
| 7,574,349 B2 | 8/2009 | Perronnin et al. | |
| 7,991,637 B1 * | 8/2011 | Guiheneuf et al. | 705/7.18 |
| 8,060,567 B2 * | 11/2011 | Carroll et al. | 709/206 |
| 8,244,821 B2 * | 8/2012 | Carroll et al. | 709/206 |
| 2004/0088358 A1 | 5/2004 | Boda et al. | |
| 2006/0136196 A1 | 6/2006 | Brun et al. | |
| 2007/0005343 A1 | 1/2007 | Sandor et al. | |
| 2007/0005344 A1 | 1/2007 | Sandor et al. | |
| 2007/0192418 A1 | 8/2007 | Adams et al. | |
| 2008/0086363 A1 * | 4/2008 | Kass | G06Q 10/04 705/7.29 |
| 2008/0288316 A1 * | 11/2008 | Chakra et al. | 705/8 |
| 2008/0319978 A1 | 12/2008 | Brun et al. | |

(Continued)

OTHER PUBLICATIONS

Ait-Mokhtar, et al. "Robustness beyond shallowness: incremental dependency parsing," in special issue of the NLE Journal, 8 (2/3) (2002), p. 121-144.

(Continued)

*Primary Examiner* — Andrew Georgandellis
(74) *Attorney, Agent, or Firm* — Fay Sharpe LLP

(57) ABSTRACT

A computer implemented system and method are disclosed for updating an electronic calendar. The method includes receiving an electronic message in a natural language in which a change in role is expressed and, with a natural language processor implemented by a computer processor, automatically detecting the change in role within the email message, optionally storing the change in role in a contacts database, and proposing updates for entries in an electronic calendar based on the detected change in role.

10 Claims, 5 Drawing Sheets

(56) References Cited

U.S. PATENT DOCUMENTS

| | | |
|---|---|---|
| 2009/0204596 A1 | 8/2009 | Brun et al. |
| 2009/0235280 A1 | 9/2009 | Tannier |
| 2010/0175000 A1 | 7/2010 | Gupta et al. |
| 2010/0179961 A1* | 7/2010 | Berry et al. ............ 707/769 |
| 2010/0318398 A1 | 12/2010 | Brun et al. |
| 2011/0004503 A1 | 1/2011 | Farrell et al. |
| 2011/0106892 A1* | 5/2011 | Nelson et al. ............ 709/206 |

OTHER PUBLICATIONS

Brun, et al. "Normalization and paraphrasing using symbolic methods" ACL: Second International workshop on Paraphrasing, Paraphrase Acquisition and Applications, Sapporo, Japan, Jul. 7-12, 2003, p. 1-8.

Saurf, et al. *TimeML Annotation Guidelines* (2006), available at www.timeml.org/site/), p. 1-71.

\* cited by examiner

SYSTEM AND METHOD FOR UPDATING AN ELECTRONIC CALENDAR

This application claims the benefit, as a Divisional Application of U.S. application Ser. No. 12/794,212, filed Jun. 4, 2010, entitled DETECTING CONFLICTS IN EMAIL MESSAGES, by Jean-Luc Meunier, et al., the disclosure of which is incorporated herein by reference in its entirety.

BACKGROUND

The exemplary embodiment relates to electronic mail systems and has particular application in connection with a system and method for detection of circularity in out-of-office e-mail messages.

Most e-mail applications allow users to enable an auto-reply function that automatically sends a response to incoming e-mail messages with a customized message sent to the sender's e-mail address. If the user plans to be absent from an office, the usual practice is for the user to set an out-of-office message which automatically responds with the indicated dates of the absence, the reason for the absence, and specifies at least one alternate contact. The user may provide a telephone, fax, e-mail, and/or other contact information for the alternate contact(s). The out-of-office message generally informs the sender that the recipient of the e-mail will not be responding to the email in a timely manner.

One problem with out-of-office messages occurs when both the user and a named alternate contact are both absent and at least has named the other as an alternate contact. If a sender attempts to contact a primary recipient they will receive an out-of-office message instructing the sender to contact the alternate contact. When the sender attempts to contact the alternate contact, he/she will receive an out-of-office message instructing them to contact another alternate contact.

The sender is presented with a cascading out-of-office message which can waste time, can be frustrating at times, and may have a negative impact to the reputation of an organization. Even further, the sender can be presented with a circular out-of-office message where the alternate contact has enabled an out-of-office message which instructs the sender to contact the primary recipient creating a circular loop. Cascading and circular out-of-office messages tend to be more prevalent during holidays when co-workers take overlapping vacation leave without consulting one another ahead of time.

There remains a need for a system and method for detecting circularity, cascading, and/or relevance in out-of-office messages.

INCORPORATION BY REFERENCE

The following references, the disclosures of which are incorporated herein in their entireties, by reference, are mentioned:

U.S. application Ser. No. 12/484,569, filed Jun. 15, 2009, entitled NATURAL LANGUAGE INTERFACE FOR COLLABORATIVE EVENT SCHEDULING, by Brun, et al. discloses a collaborative event scheduling method which includes, for each of a plurality of users, receiving a user's availability announcement in a natural language in response to a collaborative event scheduling request for which a time for an event is to be established within a time window defined by an event initiator, based on the users' availability announcements. Based on the availability announcement, with a computer processor, a representation of the user's availability within the time window is generated, including extracting a temporal expression from the availability announcement, if the temporal expression is determined to be referential, normalizing the extracted temporal expression, identifying an availability modality for each extracted temporal expression from a set of availability modalities, and generating the representation based on the normalized temporal expression and availability modality. The generated representation is output to an event scheduler for establishing a suitable time for the event, within the time window, based on the availability announcements of the users.

U.S. Publication No. 2009/0235280, published Sep. 17, 2009, entitled EVENT EXTRACTION SYSTEM FOR ELECTRONIC MESSAGES, by Tannier, discloses an event extraction system includes a temporal module which extracts temporal expressions in text content of an electronic mail message. A calendar entry generation module generates a candidate calendar entry based on an extracted temporal expression and presents it to a user for consideration as a calendar entry. The candidate calendar entry can be displayed in a transient pop up window, allowing a user to ignore the candidate entry or to accept it.

U.S. Pat. No. 7,574,349, issued Aug. 11, 2009, entitled STATISTICAL LANGUAGE-MODEL BASED SYSTEM FOR DETECTION OF MISSING ATTACHMENTS, by Perronnin, et al., discloses a method for processing electronic mail which includes computing a probability that a text string in an electronic mail message refers to an attachment as a function of a stored probability value for each of a plurality of sequences of words within the text string. Where the email message lacks an attachment, the method includes prompting a user if the computed probability indicates that the text string refers to an attachment.

U.S. Publication No. 20070005343, published Jan. 4, 2007, entitled CONCEPT MATCHING, and U.S. Publication No. 20070005344, published Jan. 4, 2007, entitled CONCEPT MATCHING SYSTEM, by Sandor and Kaplan disclose a method for developing a system for retrieving text related to a selected concept within a text corpus and a system developed by the method. Semantic classes which express the concept are each associated with a set of keywords. Syntactic rules are established which are to be applied to retrieved text which includes keywords. Each of the syntactic rules identifies a first of the semantic classes and a second of the semantic classes. A rule is satisfied when a keyword from the first of the semantic classes is in a syntactic relationship with a keyword from the second of the semantic classes.

U.S. Pat. No. 7,058,567, issued Jun. 6, 2006, entitled NATURAL LANGUAGE PARSER, by Aït-Mokhtar, et al. discloses a method and a parser for syntactically analyzing an input string.

BRIEF DESCRIPTION

In accordance with one aspect of the exemplary embodiment, an electronic out-of-office message analysis method includes, for each of a plurality of users, receiving a user-generated electronic out-of-office message in a natural language in which a time window of absence and at least one alternate named contact are expressed. Based on the out-of-office message, a structured representation of the out-of-office message is generated which links the alternate contact to a normalized representation of the time window. The structured representation of the out-of-office message is stored in a database. From the database, whether a current user's out-of-office message conflicts with another user's out-of-office message and, if a conflict is detected, the current user is notified of the conflict.

In another aspect, an electronic out-of-office message analysis system includes a mailer module comprising instructions stored in memory for receiving an electronic out-of-office message for a user in a natural language in which a time window of absence and at least one alternate named contact are expressed. A temporal expression module includes instructions stored in memory for identifying and normalizing a temporal expression from the out-of-office message related to the time window of absence. A named entity recognition module includes instructions stored in memory for identifying the at least one alternate named contact. A representation module includes instructions stored in memory for generating a structured representation of the user-generated out-of-office message which links an alternate contact to a normalized representation of the time window. An out-of-office module includes instructions stored in memory for storing the structured representation of the out-of-office message in a database and notifying a current user that a conflict exists between the current user's out-of-office message and another user's out-of-office message. A processor executes the instructions.

In another aspect, a method for updating an electronic calendar includes receiving a user-generated electronic out-of-office message in a natural language in which a time window of absence and at least one alternate named contact are expressed. Based on the out-of-office message, a structured representation of the out-of-office message is generated which links the alternate contact to a normalized representation of the time window. The structured representation of the out-of-office message is stored in a database. Updates for entries in an electronic calendar are proposed, based on the structured representation.

In another aspect, a method for updating entries in an electronic calendar includes receiving an electronic message in a natural language in which a change in role is expressed, with a natural language processor implemented by a computer processor, automatically detecting the change in role within the email message, optionally, storing the change in role in a contacts database, and proposing updates for entries in an electronic calendar based on the detected change in role.

DETAILED DESCRIPTION

Figure 1:
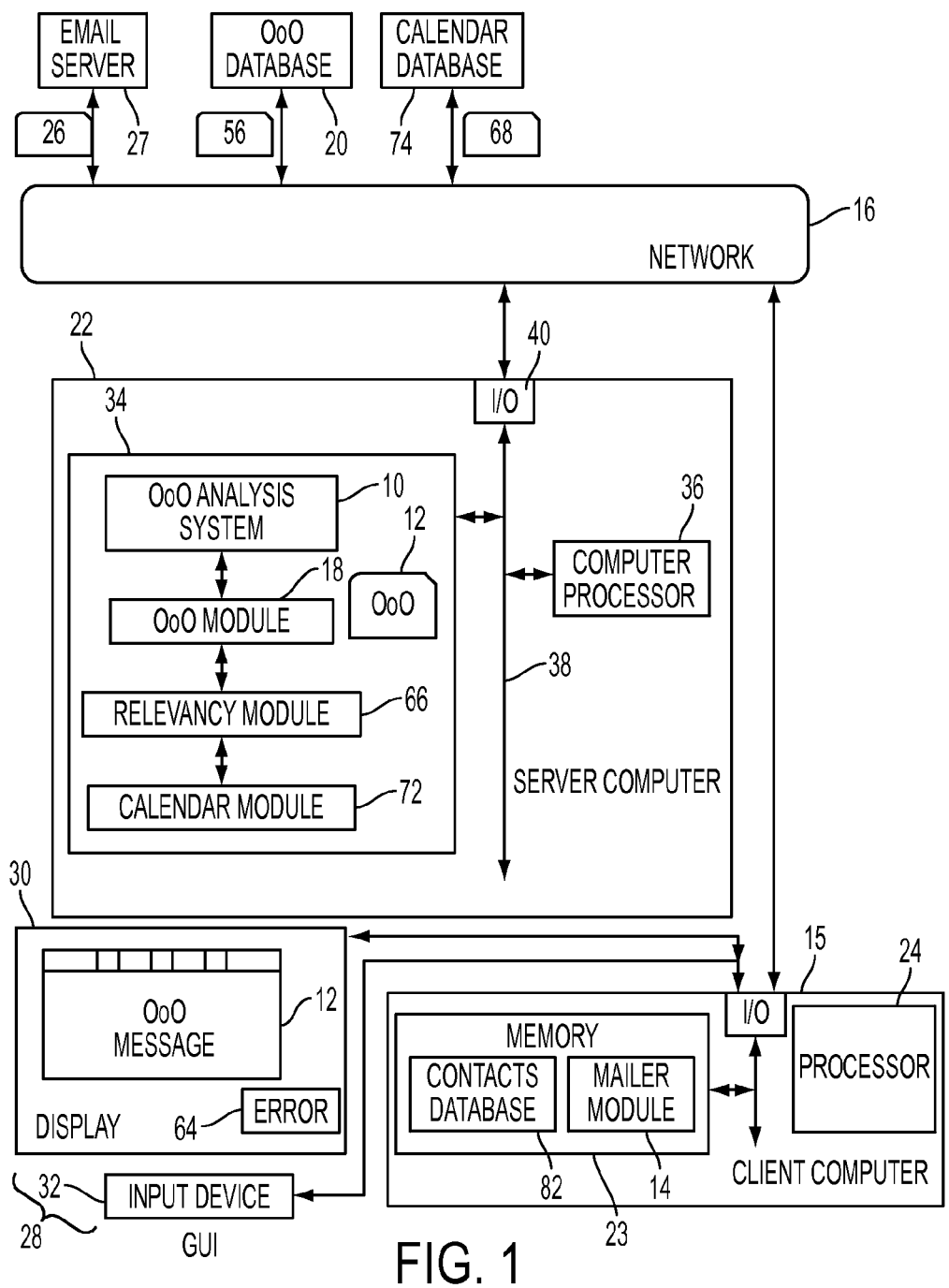
FIG. 1 is a functional block diagram of an environment in which an out-of-office message analysis system operates in accordance with one aspect of the exemplary embodiment.

The exemplary embodiment relates to an automated out-of-office message analysis system and a method for detecting a circular or cascading out-of-office message. The system and method disclosed address the problem which occurs when a sender of an electronic message receives a circular or cascading out-of-office message. A circular out-of-office message occurs when a primary recipient enables an out-of-office message which specifies an alternate contact that has also enabled an out-of-office message which specifies the primary recipient as an alternate contact. A circular out-of-office message can also occur between three or more users, for example when A designates B as an alternate contact, B designates C, and C designates A for an overlapping time period. A cascading out-of-office message occurs when the named alternate contact has enabled an out-of-office message during the same time window which species another alternate contact for overlapping time period. Consequently, the original sender receives an out-of-office message with conflicting or extraneous instructions.

In one aspect of the exemplary embodiment, the out-of-office message analysis system processes a user enabled auto-reply out-of-office message to identify references to a time period regarding a specified absence period from the office and at least one specified alternate contact. When such references are identified, the system determines whether the specified alternate contact is available during the specified absence period by determining if the alternate contact has enabled an out-of-office message with specified dates that overlap or coincide with those specified by the primary user. In the event a specified alternate contact has specified the user or another as their alternate contact during the same time window, the out-of-office message analysis system notifies the primary user of a potential conflict. An advantage of this system is that a primary user can review the alternate contact availability before the out-of-office message is set.

The exemplary out-of-office message analysis system includes a natural language processor, such as a syntactic parser with a regular natural language grammar. The natural language processor allows a user to convey an out-of-office message in natural language, e.g., as a sentence specifying a time window of absence, a reason for absence, an alternate contact, and contact information for the alternate contact for the time period when the user will be absent, as an alternative to filling the relevant information, i.e., date ranges and alternate contacts, in an ancillary process. The exemplary natural language processor analyzes the sentences of the out-of-office message in order to fill a corresponding entry into an out-of-office database.

As used herein, a temporal expression can be any piece of information that describes a time or a date, generally in the future, such as "tomorrow," "on Friday," "the next week," "the last two weeks in May," as well as specific references to dates, times, and ranges. A temporal module of the natural language processor automatically detects these expressions within the different sentences in the text content of the e-mail message. The module then computes the actual date corresponding to these expressions. The exemplary analysis system always takes as an assumption that the date in the text content is in the future relative to the sent date of the message.

As used herein, a named entity is the name or title that describes one of more individuals, generally within the organization, referenced in the out-of-office message. A named entity recognition module of the natural language processor automatically detects these references, e.g., name, organization, title, role, location, etc., within the different sentences in the text content of the out-of-office message and identifies the alternate contact from a named entity directory, such as a lightweight directory access protocol (LDAP) directory. The named entity directory is a structured directory tree which stores information hierarchically to provide logical grouping of related items. Items which may be stored in the directory for each employee include information such as full name, phone number, fax number, email, location, department, company division information, public HR information, or the like. Additionally customer information, such as contact information, address, email, etc., can be useful when suggesting candidate alternate entities, which will be discussed further.

Exemplary temporal expressions and named entities which may be found in an out-of-office message are underlined in the sentences below:

a) I will be away from my desk on Monday, please contact Mr. B (phone +1-585-423-5090) in my absence.

b) I will be on vacation starting the 20$^{th}$ of January till the 1$^{st}$ of February, please contact Mr. B until January 26$^{th}$ and Mrs. C afterwards.

c) I am at conference till the 20$^{th}$ of January. Feel free to contact Mr. B (email: mrb@abc.com) during this period.

As used herein, an "electronic message" refers to any message such as an electronic mail message (email), a text message (SMS message), voice over Internet protocol (VOIP) message, or the like, by which text and/or voice messages can be communicated between one computing device and another.

With reference to FIG. 1, an exemplary computer network hosting an out-of-office message analysis system 10 of the type described above is illustrated. The out-of-office message analysis system 10 receives an electronic out-of-office message 12 from an electronic mail (e-mail) module 14, such as an electronic mail application which may be located on a user's computer 15. A network 16, such as an internet connection, a local area network, a corporate data network, telephone line, or other wired or wireless link, serves as an electronic conduit for out-of-office messages 12 transmitted between client computers 15 and other devices linked to the network. The system 10 communicates with an out-of-office module 18 configured for detecting errors and updating an out-of-office database 20 based on the information provided to it.

The out-of-office message analysis system 10 may be hosted by a computing device 22, such as one or more general purpose computing devices or dedicated computing device(s), such as a server computer, desktop computer, laptop computer, personal digital assistant, or other device with e-mail receiving capability. In the exemplary embodiment, the system 10 may be at least partly resident on a server in communication with the user's computing device 22. The computer 15 hosts the e-mail module 14, stored in memory 23, which contains computer program instructions for implementing an electronic mail application for creating and sending e-mail messages 26 and attachments, as well as electronic out-of-office messages 12. Electronic mail (e-mail) applications are well known, such as Microsoft Outlook™ and Netscape Messenger™ systems, to interface with a remote e-mail server 27 over the network 16 to transmit and receive electronic messages. The user interacts with the e-mail module 14 via a GUI 28 hosted by display 30 operatively connected with the computer, and one or more user input devices 32, such as keyboard, touch screen, cursor control device, or the like, allowing the user to view an out-of-office message 12 displayed by the e-mail module 14 as well as compose and send electronic messages and receive and view incoming electronic messages. OoO database 20 may be hosted by the server computer 22 or by a memory storage device in communication therewith.

The out-of-office message analysis system 10 may be embodied in hardware, or a combination of hardware and software. In one embodiment, the out-of-office message analysis system 10 serves as a plug-in component to the e-mail module 14. In the illustrated embodiment, the system 10 includes processing instructions, stored in memory 34, which are executed by an associated processor 36. In particular, the processor 36 executes computer program instructions stored in memory 34 for implementing the out-of-office message analysis method described below with reference to FIG. 2 and the method shown in FIG. 4. The components of the computing device 22 may communicate via a data/control bus 38. A network interface 40 allows the computer 22 to communicate with other devices via the computer network 16, such as the user computer 15, and may comprise a modulator/demodulator (MODEM).

The processor 36 can be variously embodied, such as by a single-core processor, a dual-core processor (or more generally by a multiple-core processor), a digital processor and cooperating math coprocessor, a digital controller, or the like. The digital processor 36, in addition to controlling the operation of the computer 22, executes instructions stored in memory 34 for performing the methods outlined in FIGS. 2 and 4.

The memory or memories 23, 34 may represent any type of computer readable medium such as random access memory (RAM), read only memory (ROM), magnetic disk or tape, optical disk, flash memory, or holographic memory or any other non-transitory memory storage medium. In one embodiment, the memory 23, 34 comprises a combination of random access memory and read only memory. Memory 23, 34 stores instructions for performing the exemplary method as well as the processed out-of-office messages 12 and references to named entities and temporal expressions extracted therefrom.

As will be appreciated, FIG. 1 is a high level functional block diagram of only a portion of the components which are incorporated in a computer network. Since the configuration and operation of programmable computers are well known, they will not be described further.

Figure 3:
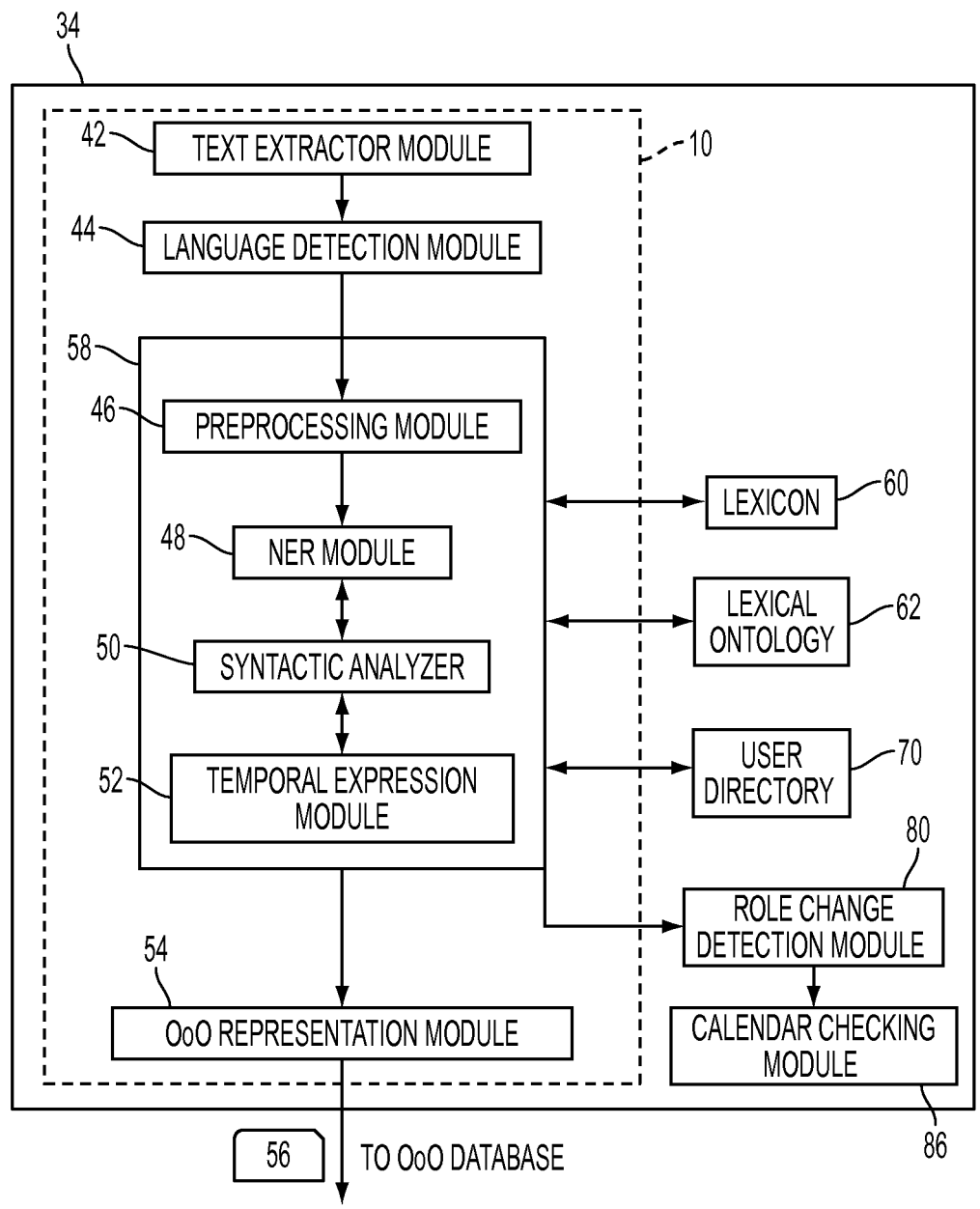
FIG. 3 is a functional block diagram of an embodiment of the out-of-office message analysis system of FIG. 1.

The out-of-office message analysis system 10 performs natural language processing (NLP) on the textual content of the out-of-office message 12 to identify references to a time window of absence and an alternate named entity, i.e., an alternate contact such as a colleague, administrative assistant, or the like. As illustrated in FIG. 3, the out-of-office message analysis system 10 includes various processing components 42, 44, 46, 48, 50, 52, 54 which are described, for ease of discussion, as separate modules, although it is to be appreciated that one or more of these may be combined. The processing components may work on the input of a prior module. In some cases, text may be returned to a prior module for further processing.

The exemplary processing components include a text extractor 42, which extracts text content to be processed; an optional language detection module 44, which detects the language used; a preprocessing module 46, which performs standard linguistic preprocessing; a named entity recognition (NER) module 48, which identifies named alternate entities; a syntactic analyzer module 50, which identifies relationships between text elements; a temporal expression (TE) module 52, which identifies temporal expressions and normalizes temporal information from the identified temporal expressions; and an out-of-office representation module 54, which generates a structured representation 56 of the out-of-office message according to the extracted named alternate entities and the temporal expression. The out-of-office expression module 54 supplies the structured representation 56 to the out-of-office module 18. Some or all of these modules may be incorporated into a natural language processor (NLP) 58.

The NLP 58 has access to a lexicon 60 and a lexical ontology module 62. Lexicon 60, which may be in the form of finite state transducers, indexes words according to their parts of speech. In one embodiment, lexicon 60 indexes a set of words which are classed as representing absence topics (words like "vacation," "away," "traveling," "ill," etc.) allowing these to be tagged accordingly. Lexical ontology 62 indexes named entities according to their type, in particular PERSON, ORGANIZATION, and LOCATION named entities. Lexicon 60 and lexical ontology 62 may be stored in memory 34 or elsewhere, such as at a remote location which is accessed via the network 16.

With reference once more to FIG. 2, a flowchart illustrating an exemplary computer-implemented out-of-office message analysis method is shown, which may be performed with the out-of-office message analysis system shown in FIGS. 1 and 3. As will be appreciated, the method may include fewer, more, or different steps and that the steps need not all proceed in the order illustrated. The method begins at S100.

At S102, an out-of-office message 12 generated by a user is detected and is input to the system 10.

At S104, text content is extracted from the out-of-office message 12.

At S106, the text content may be processed to determine whether it includes text recognized as being in the language (or one of the languages) accepted by the analysis system 10.

At S108, preprocessing of the out-of-office message text may be performed.

At S110, text elements corresponding to named entities may be identified by the named entity recognition (NER) component 48, and labeled or tagged as such.

At S112, temporal expressions are extracted to identify temporal information (dates and times) which are normalized into a suitable form for inputting to the out-of-office database 20.

At S114, a structured representation 56 is generated in which identified named entities are identified as alternate contacts and linked to the normalized temporal expressions.

At S116, possible circularity and cascading errors with links between the user and alternate contacts are determined.

Optionally, at S118, if no circularity or cascading error is detected, the alternate contacts are processed to identify changes in position, role, organization, or the like to determine if the alternate contact is a relevant alternate contact.

At S120, if a conflict is detected at S116 or S118, e.g., circularity or cascading out-of-office message is detected or an alternate contact is determined to be non-relevant, the user is presented with a warning and may be shown the out-of-office message or alternate contact which triggered the conflict.

At S122, the user is prompted to modify the alternate contact or suggested candidate alternate entries are presented to the user. Steps S118-S122 are repeated for each change to the structured representation 56.

At S124, the structured representation 56 extracted from the text content is entered into the out-of-office database 20. A single out-of-office message 12 may give rise to multiple directed links, for example, where there is more than one named alternate contact, each associated with either the same or a different time period. Optionally, the user may be presented with the structured representation 56 (e.g., via GUI display 30) and given the opportunity to modify it.

At S126, entries in a user's electronic calendar (e.g., stored in database 74) are updated according to the identified temporal expression, e.g., by submitting a calendar entry/update 68. Scheduled meetings and requested meetings may be updated and participants may be notified of the impending absence.

The method ends at S128, and can be repeated with each new out-of-office message 12 that is input. Further details of the exemplary system 10 and method now follow.

Out-of-Office Message Input (S102)

In one embodiment, the user generates an out-of-office message 12 using the e-mail module 14, e.g., an email application installed on a general purpose computer 15, which uploads the message 12 to the analysis system 10. When a new out-of-office message 12 is received, it is promptly analyzed by the out-of-office message analysis system 10.

Text Extraction (S104)

The text extractor 32 extracts text from the content of the out-of-office message 12.

Language Recognition (S106)

The optional language detection module 44 includes instructions for detecting the language used in the out-of-office message 12. The out-of-office message analysis system 10 may be configured for a particular natural language, such as English. Optionally, the text extractor 42 includes different modules appropriate to different languages. Text which is not in one of the recognized languages may be ignored, flagged as not being processable, or translated prior to further processing.

Natural Language Processing

The out-of-office message analysis system 10 relies on natural language processing techniques to identify linguistic elements in a text string in a natural language, such as English. This function may be performed by the natural language processor 58 or "parser". The natural language processor takes a text document (here an OoO message) as input and breaks each sentence into a sequence of tokens (linguistic elements) of the type described above. The parser provides this functionality by applying a set of rules, called a grammar, dedicated to a particular natural language such as French, English, or Japanese. The grammar is written in the formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed for example in Salah Aït-Mokhtar, Jean-Pierre Chanod, and Claude Roux, "Robustness beyond shallowness: incremental dependency parsing," in special issue of the NLE Journal (2002); above-mentioned U.S. Pat. No. 7,058,567; and Caroline Brun and Caroline Hagège, "Normalization and paraphrasing using symbolic methods" ACL: Second International workshop on Paraphrasing, Paraphrase Acquisition and Applications, Sapporo, Japan, Jul. 7-12, 2003 (hereinafter Brun and Hagège). These example natural language processing techniques are well suited for analysis of out-of-office message content which can sometimes be grammatically informal or can use a telegraphic style that does not employ grammatically complete sentences and paragraphs. Other natural language processing or parsing algorithms can be used. In one embodiment the natural language processor 58 may be based on the Xerox Incremental Parser (XIP), which may have been enriched with additional processing rules to facilitate the extraction of references to an absence event.

The natural language processor 58 incorporates a pre-processing module 46 which handles tokenization, morphological analysis and POS tagging (S108). Specifically, the preprocessing module 46 breaks the input text into a sequence of tokens, each generally corresponding to a text element, such as a word, or punctuation. Parts of speech are identified for the text elements, such as noun, verb, etc. Some tokens may be assigned more than one part of speech. The tokens are tagged with the identified parts of speech.

A surface syntactic analysis stage consists of chunking the input to identify groups of words, such as noun phrases. This stage may also include a Named Entity Recognition (NER) process (S110), as described below.

Named Entity Recognition (S110)

Named entities are proper nouns which are recognized as being in a particular class from a set of classes, such as PERSON, LOCATION, DATES, etc. The NER module 48 identifies and tags named entities corresponding to person and contact information. The identified tags are cross-referenced with a named entity directory, i.e., a user's personal or company's shared contact list (directory). The identification of named entities works under the assumption that the classes are exhaustively listed in a closed subset that ensures high precision. For example, the NER module 48 may search the company contact directory tree using lightweight directory access protocols (LDAP) to query the named alternate entities' contact information.

The person names identified are tagged as named alternate entities which are alternate contacts defined by the user for use during the absence event. The identified contact information (e-mail, fax, phone, etc.) are tagged for named alternate entities which may assist the NER module 48 in the case where multiple similar entities identified. Moreover, add-ons to the lexicon optionally include organization-specific entries, such as the names of specific corporate projects, committees, organizational position, role, contact information, and the like, that may be expected to be used in connection with relevancy of the alternate contact. Detection of contact information, such as phone numbers, fax numbers, and e-mail addresses, is detected based on pattern matching techniques, e.g., finite state techniques, which detect fixed sequence of numbers with known prefixes for phone/fax numbers and constrained patterns of the presence of "@" for detected e-mail addresses. Where the text content identifies only a portion of the named entity, a user directory 70 may be used supplement this information.

Further details on the process of named entity recognition are to be found in application Ser. No. 11/846,740, filed Aug. 29, 2007, entitled A HYBRID SYSTEM FOR NAMED ENTITY RESOLUTION, by Caroline Brun, et al.; application Ser. No. 12/028,126, filed Feb. 8, 2008, entitled SEMANTIC COMPATIBILITY CHECKING FOR AUTOMATIC CORRECTION AND DISCOVERY OF NAMED ENTITIES, by Caroline Brun, et al.; and U.S. Pub. No. 2006/0136196, entitled BI-DIMENSIONAL REWRITING RULES FOR NATURAL LANGUAGE PROCESSING, by Caroline Brun, et al., the disclosures of which are incorporated herein in their entireties by reference.

Temporal Expression Extraction and Normalization (S112)

The temporal expression module 52 serves to extract temporal expressions from the out-of-office message text content, and may be incorporated into the NLP 58, as noted above. In performing the identification of temporal expressions, the temporal expression module 52 may access the lexicon 60. The lexicon may be enriched with a set of standard temporal expression terms, such as "tomorrow," "last two weeks of the month," "until January 20th," "next," and the like, along with information as to how the corresponding dates are to be calculated.

The temporal processing has the following purposes: recognizing and interpreting temporal expressions, normalizing incomplete or referential temporal expressions into absolute dates, and linking these expressions to the corresponding name alternate entities they correspond to. The temporal processing may be performed using a method similar to that outlined in the TimeML standard for detecting and normalizing temporal expressions (see Saurí, R., Littman, J., Knippen, B., Gaizauskas, R., Setzer, A., Pustejovsky, J.: *TimeML Annotation Guidelines* (2006), available at www.timeml.org/site/).

Several types of temporal expression are of particular interest: simple dates, durations, and intervals, which will be discussed in further detail. Simple or absolute dates are temporal expressions of the kind "Jan. 20, 2010" which are explicit and can be represented in a straightforward way. Durations are time expressions denoting a time period, for instance, "all next week," "the last two weeks in June".

Intervals are expressions that denote duration where explicit time boundaries are expressed completely, in the form of a lower and an upper bound of the temporal interval, or incompletely, generally as the return date or the upper bound of the temporal interval. Complete intervals correspond to expressions such as "from Monday to Friday" or "between January $20^{th}$ and $23^{rd}$". Incomplete or referential time expressions correspond to expressions such as "until Friday," "[I will be] back on Friday," "between Monday and Friday" which specify a departure date, return date, or reference a date. As previously noted, the incomplete or referential dates are normalized to absolute dates for entry into the out-of-office database. Absence event tags, like "return," "leave," "until," which are associated with the temporal expressions are used to determine if the temporal expression corresponds to a lower bound or upper bound.

Referential or incomplete dates are assumed to be relative to the current date. For example, if the extracted temporal expression is January $20^{th}$ and the current date is Jan. 20, 2010, the temporal expression module 52 normalizes the referential date to be Jan. 20, 2010 and not Jan. 20, 2009 or Jan. 20, 2011. In the case of a temporal expression, such as "Friday," the temporal expression module 52 assumes the referential date to be the subsequent Friday or "next Friday" and normalizes the date correspondingly. In situations where only one bound, i.e., the lower bound or upper bound, can be extracted from the out-of-office message, the temporal expression module 52 will assume bounds according to the current date. Alternatively, a warning may be generated indicating to the user that a bound is missing. For example, if the lower bound or departure date is identified and normalized, while the upper bound remains undefined or blank, this may correspond to situation where time window of absence is indefinite. If the upper bound or return date is identified and normalized, the lower bound is assumed to correspond to the date the out-of-office message was generated. If no bounds are identified, the lower bound is assumed to correspond to the date of generation of the out-of-office message and the upper bound remains undefined.

Structured Representation Generation (S114)

Once, temporal expression(s) have been identified and normalized, such that the lower and upper bounds have been defined, and the named alternate entities have been identified, a structured representation 56 of the out-of-office message is generated to be entered into the out-of-office database 20. Each structured representation includes a reference to the user and each alternate named entity (alternate contact) as defined in the named entity (user) directory 70, and the corresponding normalized beginning and end time expressions. Thus for example, in the out-of-office message "I will be out of the office till January 23$^{rd}$. Please contact Mr. B, Mrs. C, or Mr. D in my absence," the following is a structured representation 56, assuming the out-of-office message was generated on January 20$^{th}$ by Mrs. F:

(F, B, 01/20/2010, 01/23/2010)
(F, C, 01/20/2010, 01/23/2010)
(F, D, 01/20/2010, 01/23/2010).

The structured representation 56 thus includes three directed links, which link the user to each alternate named entity, and a single temporal interval. However, multiple temporal intervals for each directed link are also contemplated.

Cascade and Circularity Detection (S116)

The structured representation 56 maybe entered into the out-of-office database 20, or stored into a temporary buffer of the memory 34 prior to error detection. The out-of-office module 18 determines if an error exists by checking if one of the named alternate contacts has generated an out-of-office message. In an exemplary embodiment, the out-of-office database is organized as a tree or graph structure. A greedy exploration of the tree structure can determine if the alternate named entity has entered an out-of-office message and whether the time interval defined by the user and the alternate named entity overlap. If an overlap of time intervals is detected, a cascade or circularity is present and an audible and/or visual warning 64 is presented to the user (S120) via the GUI 28. The GUI may instruct the user to define another alternate entity or suggest, to the user, a candidate alternate entity (S122). Alternatively, the user may force the OoO to be accepted with the defined alternate named entity, despite the error. The suggestion can be generated by the out-of-office module 18 or a relevancy module 66 which is based on a relevancy measure, which will be discussed in greater detail below, between user's corresponding company directory data and other entities' directory data. After the modified out-of-office message 12 is generated, one or more of steps S110, S114, and S118 may be repeated.

Relevancy Detection (S118)

If no circularity and cascade errors are detected in the structured representation 56 of the out-of-office message 12, the relevancy module 66 optionally analyzes the alternate named entity to detect relevancy errors (S118). A relevancy error occurs when the alternate named entity is no longer relevant to the user as an alternate contact, i.e., the alternate named entity has been promoted, relocated, terminated, or the like. For example, when a customer tries to contact the user for information regarding a specific transaction, the customer will be forwarded to the alternate named entity, via the out-of-office message, to retrieve the same information. If the alternate named entity is no longer relevant, the customer will not be able to retrieve the information and will be forced to contact another alternate named entity.

To avoid this situation, the relevancy module 66 uses information regarding a user's and an alternate named entities' organizational descriptors, such as job title, position, role, department, committees, projects, location, contact information, customers, or the like, to determine if the alternate named contact is a relevant contact during the user's absence. The organizational descriptors 68 may be stored in the contact directory as part of the lexicon 60 or in an organizational database 70 which tracks changes in the organization and maintains a current status of the descriptors. If the alternate named entity is not relevant, steps S122 and S114-S118 are repeated. It should be appreciated that the organizational descriptors can also be used to suggest candidate alternate entities.

Updating the Out-of-Office Database (S124)

After circularity and cascade errors are eliminated (S116) and the alternate named entity is determined to be relevant (S118), the structured representation 56 is entered into the out-of-office database 20 (S124) by the out-of-office module 18. Optionally, the structured representation may be presented to the user, via the GUI 28, for confirmation prior to storing in the database 20. In the exemplary embodiment, the out-of-office database 20 is a remote database linked to the server computer and client computer(s) by the network 16. The entry can be automatically removed from the database when the upper bound of the temporal expression, i.e., the return date of the user, is reached. Typically, the out-of-office message 12 is automatically disabled from the mailer module 14 according to the return date which can trigger the deletion from the out-of-office database 20. Alternatively, the user can manually remove the entry directly or indirectly by manually disabling the out-of-office message 12.

Updating the Electronic Calendar (S126)

A calendar update module 72 updates calendar entries for the user's and/or alternate named entities' shared electronic calendars 74 or a local electronic calendar stored in the memory 23. If the user has scheduled meetings during the defined absence period, the update module 72 can notify participants, identified in the meeting entry, of pending the absence or the module 72 can instruct the e-mail module 14 to notify the participants via an electronic message.

Figure 4:
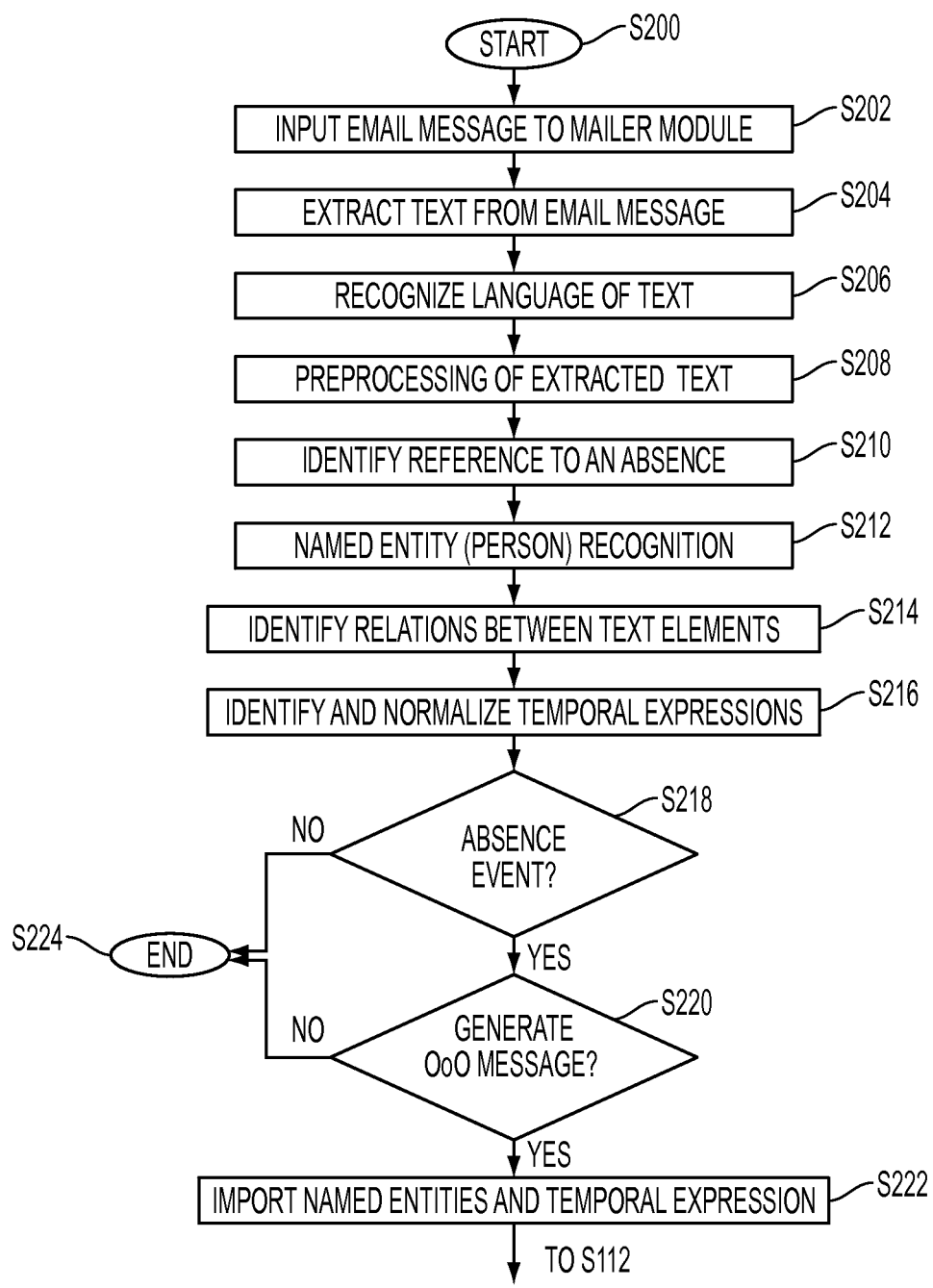
FIG. 4 illustrates an electronic mail message analysis method in accordance with another aspect of the exemplary embodiment.

With reference now to FIG. 4, a flowchart illustrating another embodiment of an electronic mail message analysis method is shown, which may be performed with the out-of-office message analysis system shown in FIGS. 1 and 3. The natural language processor 58 may be configured to analyze e-mail messages 26, rather than simply out-of-office messages, to identify a possible absence event.

As will be appreciated, the method may include fewer, more, or different steps and that the steps need not all proceed in the order illustrated. The method begins at S200.

At S202, an e-mail message 26 generated by a user is detected and is input to the system 10.

At S204, text content is extracted from the e-mail.

At S206, the text content may be processed to determine whether it includes text recognized as being in the language (or one of the languages) accepted by the analysis system 10.

At S208, preprocessing of the out-of-office message text is performed.

At S210, references to absence events are detected.

At S212, text elements corresponding to named entities may be identified by the named entity recognition (NER) component 54, and labeled or tagged as such.

At S214, the text elements of a text string, such as a sentence, in the input text are processed by the syntactic module 50 to identify syntactic relations between text elements, such as between words or groups of words.

At S216, temporal expressions are extracted to identify temporal information (dates and times) and normalized into a suitable form for inputting to the out-of-office database 20.

At S218, detection of an absence event is performed.

At S220, if an absence event is detected, the user is requested to generate an out-of-office message.

Optionally, at S222, if the user chooses to generate an out-of-office message, the out-of-office module 18 may generate a template by importing the already identified alternate named contact(s) and temporal expression(s).

Figure 2:
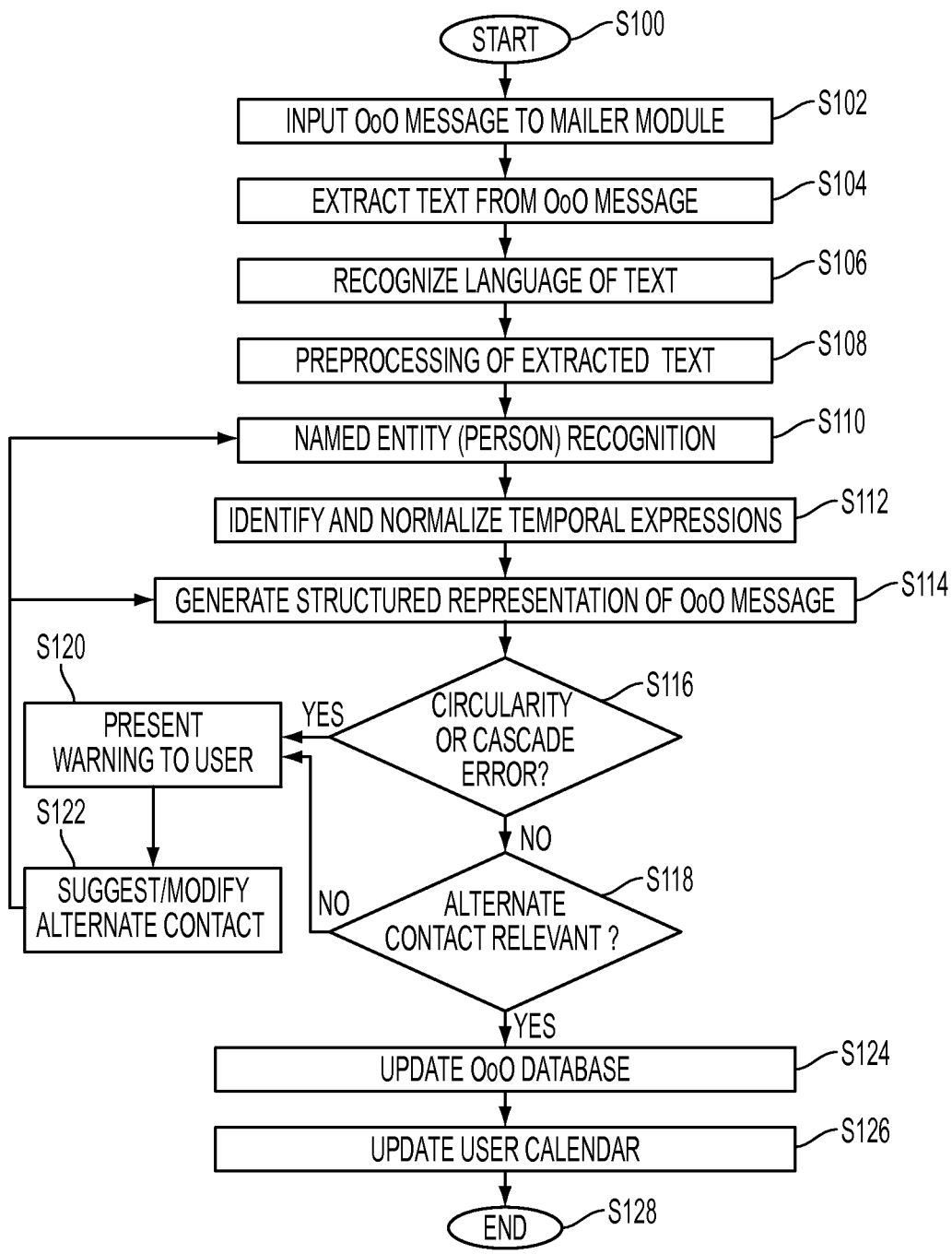
FIG. 2 illustrates a method for detecting circularity in out-of-office messages in accordance with an another aspect of the exemplary embodiment.

The method may proceed from S222, to S112 of FIG. 2. Otherwise, the method ends at S224, and can be repeated with each e-mail message 26 that is input.

The method steps S202-S208, S212, and S216 are analogous to the steps S102-S108, S110, and S112, respectively, of the method of FIG. 2 except that an e-mail message is analyzed rather than an out-of-office message. Therefore, steps S202-S208 will not be discussed in detail.

In the embodiment of FIG. 4, the NLP 58 may be configured to analyze e-mail messages 26 sent or received by the user to identify a possible absence event. Rather than a user manually defining an out-of-office message, the analysis system 10 may suggest an out-of-office message based on the user's e-mail correspondence. For example, if:

a) the user sends a message to a colleague stating "I have just bought the airline tickets for the June conference in Europe," or b) a superior may comment "Mr. B, your vacation for January has been approved,"

then analysis system 10 may request the user, via the GUI 28, to generate an out-of-office message. For undirected analysis of e-mail messages 26, a deeper, robust syntactic analysis of e-mail messages 26 performs first a simple syntactic dependency analysis and then a deep analysis by a syntactic analyzer 50. "Robust" means here that any kind of text can be processed by the NLP (including output of an OCR system or ill-formed input). "Deep" means that linguistic information extracted by the parser can be of a subtle nature and not necessarily straightforward. XIP extracts not only superficial grammatical relations in the form of dependency links, but also basic thematic roles between a predicate (verbal or nominal) and its arguments. For syntactic relations, long distance dependencies are computed and arguments of infinitive verbs are handled. See (Brun and Hagège) for details on deep linguistic processing using XIP. The deeper syntactic analysis performs first a simple syntactic dependency analysis and then a deep analysis. The syntactic analysis part of the text parsing (S214) is used to identify events in which the recipient is the agent who is to participate.

Deep syntactic analysis processing of sentences is suitably used to identify action verbs indicative of participation, and to identify content setting forth events in which the e-mail message recipient is the designated agent for participating in the event. More generally, deep syntactical analysis enables processing of various complex linguistic forms to identify the agent. Deep syntactic analysis enables determination of action items in which the recipient e-mail user is expected to do something. For example, deep syntactic analysis may employ lexical semantics associated to predicates that appear in text and linguistic links between those predicates and linguistic objects that denote the user.

Further extensions to the core grammar tool, dealing for example with pronominal co-reference or metonymy of named entities, can be plugged in.

Identification of Reference to Absences (S210)

The out-of-office message analysis system 10 looks for a specific set of words which are indexed as being absence events, such as vacation, away, traveling, ill, sick, absent, leave, return, etc. This set of absence event words may be stored in the lexicon 60, or a separate lexicon that is suitable for the natural language in which the out-of-office message content 12 is written. These words may be stored in an ontology by providing synonyms for some words. The ontology may be specific to the application. For example, it may be enriched with specific absence event commonly used in the user's personal or company's shared calendars. In the exemplary embodiment, absence events (that can be temporally marked) may include those having the one or more of the following linguistic elements:

Any verb expressing either an action or a state

Any deverbal noun, when there is a clear morphological link between this noun and a verb (e.g., "interaction" is a derivation of the verb "interact")

Any noun which is not a deverbal noun and that can be any of:

An argument of the preposition "during"

A subject of the verb "to last"

A subject of the verb "to happen" or "to occur," when these verbs are modified by an explicit temporal expression.

These nouns are referred to as time span nouns. Examples of such nouns are words such as "sunrise" and "football game" that intuitively correspond to nouns denoting an event of certain duration.

A list of such nouns and verbs can be obtained by applying the above-mentioned heuristics to a corpus of text strings, such as the Reuters Corporation, NIST, and/or a more application specific set of text strings, such as company out-of-office messages, e-mails, company literature, and the like. The list can be stored in memory 24.

Generating an Out-of-Office Message (S220)

If an absence event is detected (S218), the out-of-office module 18 may request the user, via a transient pop-up window on the user's computing device 15, to generate an out-of-office message. This provides the user an opportunity to accept the detected absence event.

Optionally, the out-of-office module 18 may automatically generate a candidate out-of-office message 12 (S222) which is presented to the user, via a transient pop-up window, for acceptance. The out-of-office module imports the identified alternate named contacts and temporal expressions into a generic template which can be modified by the user to create a personalized out-of-office message 12.

Once the out-of-office message 12 is generated, it is then analyzed using the method of FIG. 2 to detect circularity, cascade, and/or relevancy conflicts.

Alternate Embodiment for Updating Calendar Entries

Another conflict which can be detected through analysis of email messages is a change in role of a person. This information can be used to update calendar entries for meetings. As used herein, a meeting can be any scheduled event for which a number of participants are invited to attend, such as a telephone conference, in person meeting, organizational event, or the like. Meeting participants, as used herein, including invitees who have not responded as well as those who have accepted a meeting request. A role change may be a change in position, job function, responsibility for a particular project, or the like which may affect whether the person's participation in a meeting is no longer relevant.

In large companies or other organizations, people involved in management activities tend to participate in numerous meetings. Their calendars are often booked with many meeting requests involving many different people. People from many different parts of an organization can be involved in a teleconference, and in such cases, the organizer of the meeting may not know all the invitees personally. He may know, for example that they are in charge of a specific activity/department that is related to the topic of the meeting.

Managing the lists of participants, specifically for recurrent meetings can be difficult when participants change roles within the company. In such cases, the organizer may have to update his calendar entries and requests to reflect the change. He has to remove from the list of attendees those that are no longer relevant and add new people that are now in that role.

In various aspects, the exemplary system 10 can be used to parse the content of incoming emails in order to detect information related to a change in the organization chart, a promotion, or the like and to compare it with lists of people involved in meetings already scheduled in the user calendar. This allows the system to propose and execute proper modifications in the organization of these meetings.

In addition to the natural language processing module 58, the system 10 includes a role change detection module 80 (FIG. 3), which serves to detect any possible changes with respect to the roles of meeting participants. The change in role may be a promotion, change of department, change in project responsibility, or the like. If such a change is detected, as outlined below, the component 80 scans the content of the user calendar stored in database 74 in order to compare the name of all participants for a scheduled meeting in order to trigger modifications. These modifications can be for example to send (e.g., after a user's approval) a cancellation notification to people whose role in the organization has changed such that their participation in the meeting is no longer relevant and to those for whom a change in role now makes them relevant. For example, a person who is no longer in charge of a project which is the subject of a meeting may be sent a notification that he is no longer required to attend and/or a meeting request may be sent to a person who now has that role.

The role change may be detected using the natural language processor 58. For example natural language processor 58 detects, from the text of an incoming email (or attached document) personal information (such as name, job title, email address, department, etc.) as well as indications about a modification with respect to a previous situation.

This information may be detected as isolated pieces of information within the text and connected by identifying links between them (e.g., make the connection between a name and a job title). The system may assign, for each person: first name; family name; job title; and, where possible:—department/office name; phone number; location; and email address. This task can be carried out with appropriate lexicons, pattern matching or dependency rules. The detection of the appropriate links can be achieved using local dependencies and/or long-range co-reference resolution. Once details about people have been detected within email text, they may be stored in a local contacts database 82, e.g., within the client computer 15 (FIG. 1) to enable comparison between new information and old information in order to detect possible changes.

Alternatively or additionally, the system looks for evidence, within the email text, of a change in role. For this task, a set of phrases indicative of a role change may be established and, when identified within the text, a role change is output. The following are examples of expressions indicative of a role change.
  1. Announcement (e.g., "I am pleased to announce . . . ," or "Please note that . . . ");
  2. Promotion (e.g., "Mr. X has been promoted to," "will now take charge of . . . ")
  3. Re-organization (e.g., "organizational changes . . . ")

This role change expression may be used in addition to or as an alternative to the comparing of an identified job title with previous knowledge to detect that the content of the email carries information about a role change that may need to be taken into account in updating calendar entries.

The system may identify, within the email text, which person/people are affected by the detected role change by detecting people information and comparing it with previous knowledge in the database, as described above, and/or by applying specific parsing rules to detect the scope of the announcement.

For example, given the message:
  I am pleased to announce that Jane Doe has accepted an assignment to join the NewCo Research Center, Newtown as the Manager of the Marking Elements Laboratory. As the head of MEL, Jane will be responsible for the technology development in novel printing systems. I am also pleased to announce that John Doe will replace Paul Smith and manage the Materials Synthesis and Characterization Laboratory at NewCo Research Center, Canada while still continuing his responsibilities as the NewCo Direct Marketing manager.

From this, the system extracts:
  1. Name: Jane Doe; Company: NewCo Research Center; Location: Newtown; New Job Title: Manager of the Marking Elements Laboratory"
  2. Name: John Doe; Company: NewCo Research Center; Location: Canada; New Job Title: manage the Materials Synthesis and Characterization Laboratory; Former role holder: Paul Smith.

Such an announcement contains the new roles of concerned people, and may also contain references to their previous role or previous holder of the role they are assuming. This information is useful for suggest possible replacements in the calendar entries.

Once a change in role for a person has been detected, a calendar checking module 86 (FIG. 3) looks for the people associated with a role change in already scheduled meetings that appear in the user's calendar (and optionally also the calendars of other users). Once a change has been detected in an incoming email, the calendar checking module 86 of the system 10 connects to the user calendar and searches for all meeting entries that are scheduled from the current date for a given period, e.g., a 12 month period. Each time a meeting is detected with the name of someone involved in a role change within the list of participants, the system 10 may notify the user. For example, the system displays a pop-up window containing the details of the meeting, as well as the highlighted name/address of people that may no longer be relevant due to a role change and/or may suggest new participants(s) who have assumed that role, depending on what information has been extracted within the email message and/or can be extracted from the contacts database. The system may propose to replace the original name with the new one. If the user decides to do so, then the system may send one or more of a cancellation email to the former participant of the meeting and a meeting request to the new person in that role. When recurring meetings are detected, then if a modification is accepted by the user it can also be propagated to all remaining meetings.

Figure 5:
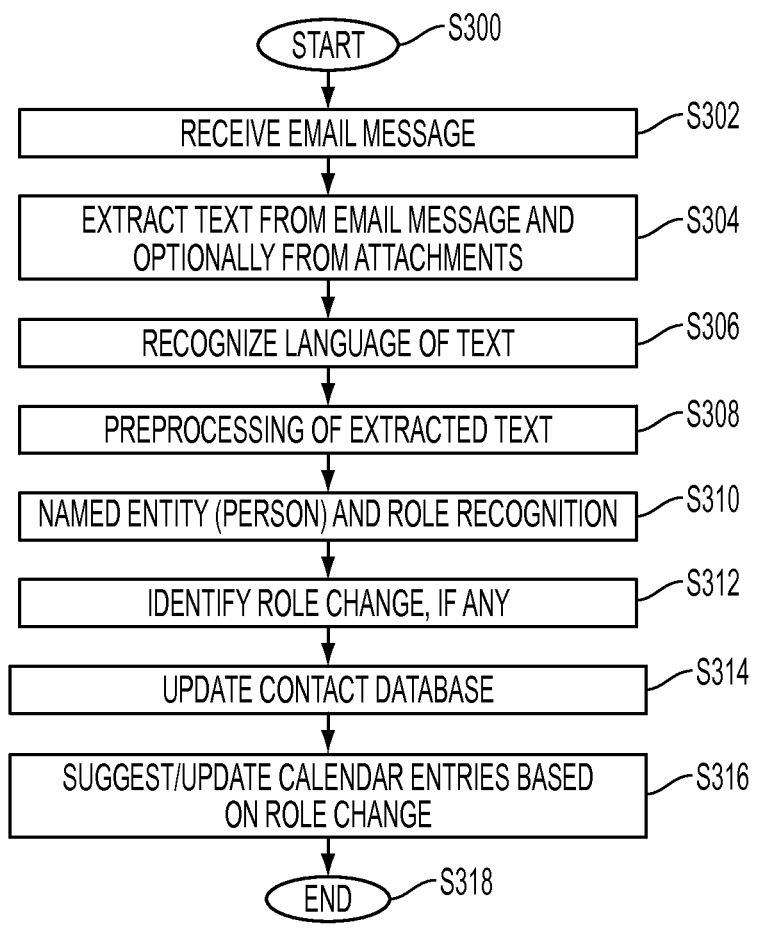
FIG. 5 illustrates an electronic mail message analysis method in accordance with another aspect of the exemplary embodiment.

FIG. 5 illustrates the exemplary method. The method begins at S300. At S302, an email message is received by the system.

At S304, text is extracted from the email message and possibly also from attachments. Language recognition (S306) and preprocessing (S308) may be performed as described for the method of FIG. 2.

At S310, named entities (person names and associated job title/role inside the organization) are identified.

At S312 indications of a role change, such as promotion/ organizational changes are detected, where present. If changes are detected, the role information, where present, is extracted. For example, for each person involved in a role change, extract: former job title/department; new job title/ department; person that will now be in charge.

At S314, the contacts database for all detected person names, user contact database 82 is searched. If the person name does not exist, then an entry for that person name is created. If an existing entry needs to be modified, based on a detected role change, the existing entry is updated.

At S316 the calendar is updated based on the extracted information. For example, a list of updated names/roles in the contact database is created and used by the calendar update module 72 to search the calendar entries in the user's calendar for meetings. For each meeting in the user's calendar for a given time frame, the list of updated names/ roles is compared with a list of participants and their roles. For each person involved in a change that also appears in the list of participants of a given meeting, then:

a) If the name of his successor has been identified, then propose to the user to
  (i) Send a meeting cancel note to the former participant
  (ii) Send a copy of the meeting request to the successor
  (iii) Update the user calendar (if it is a recurring meeting, then apply the modification to all remaining meetings).
(b) otherwise,
Send an email to the former participant to ask him who will be his successor (the content of the email can also be displayed to assist the user finding a clue that may have been missed by the position and organizational changes detection step).

The method ends at S318.

The methods illustrated in FIGS. 2, 4 and 5 may be implemented in one or more computer program product(s) that may be executed on a computer. The computer program product may be a non-transitory computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in any one of FIGS. 2, 4, and 5 can be used to implement the exemplary methods.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for updating an electronic calendar comprising:
receiving an electronic mail message in a natural language in which a change in role is expressed;
with a natural language processor implemented by a computer processor, parsing the electronic mail message using a set of predefined phrases that are indicative of a role change, the predefined phrases relating to at least one of an announcement, a promotion, and a reorganization, and automatically detecting the change in role expressed by one of the predefined phrases within the parsed electronic mail message, and optionally also providing for detecting at least one of a job title and a job location;
storing the change in role in a contacts database within a client computer in communication with the computer processor;
searching entries already scheduled in a client's electronic calendar for meetings, wherein the entries are stored in a remote calendar database;
for each meeting, comparing the participants of the meetings with each person involved in the change in role in the contacts database; and
for each person involved in the change in role that also appears as a participant of a given meeting, proposing an update to an entry in the electronic calendar that corresponds to the meeting.

2. A computer program product comprising a non-transitory medium on which a computer program is recorded which when executed by a computer performs the method of claim 1.

3. The method of claim 1, including the storing of the change in role in the contacts database.

4. The method of claim 1, further comprising identifying people associated with a role change in already scheduled meetings that appear in the electronic calendar and for a meeting which is detected with the name of someone involved in a role change within the list of participants, notifying the calendar's user.

5. The method of claim 1, further comprising for a person involved in the change in role, identifying, from the text of the electronic mail message or an attached document, a former job title; a new job title; and another person that now has the former job title.

6. A system for updating an electronic calendar comprising:
a natural language processing module executing on a computer processor for parsing the content of a received incoming electronic mail message in a natural language;
a role change detection module executing on the computer processor for automatically detecting a change in role that is expressed within the parsed electronic mail message using a set of established phrases indicative of a role change and identifies a person affected by the detected role change, the role change detection module optionally also providing at least one of a job title and a job location, wherein in response to detecting the change in role expressed in the electronic email message, the role change detection module searches a remote calendar database for meetings in entries already scheduled in a client's electronic-calendar and compares participants of each meeting with each person involved in the change in role in a contacts database to determine if a person associated with the detected change in role also appears as a participant in a given meeting;

the contacts database within a client computer in communication with the computer processor for storing the change in role; and a calendar checking module executing on the computer processor for, wherein in response to the role change detection module determining that a person associated with the detected change in role also appears as a participant in a given meeting, proposing an update to an entry in the electronic calendar that corresponds to the meeting.

7. The system of claim 6, wherein the calendar checking module looks for people associated with a role change in already scheduled meetings that appear in the user's calendar and for a meeting which is detected with the name of someone involved in a role change within the list of participants, notifies the user.

8. The system of claim 6, wherein for each person involved in a role change, the role change detection module extracts, from the text of the electronic mail message or an attached document, a former job title of the person; a new job title of the person; and another person that now has the former job title.

9. The system of claim 6, further comprising a mailer module comprising instructions stored in memory for receiving an electronic out-of-office message for a user in a natural language in which a time window of absence and at least one alternate named contact are expressed.

10. A network computer system comprising the system of claim 6 and a plurality of client computers, each configured for generating out-of-office messages, the system for updating an electronic calendar being resident on at least one of the client computers and a server computer in communication therewith via a network and wherein the database is linked to the at least one of the client computers and the server computer via the network.

* * * * *